United States Patent Office

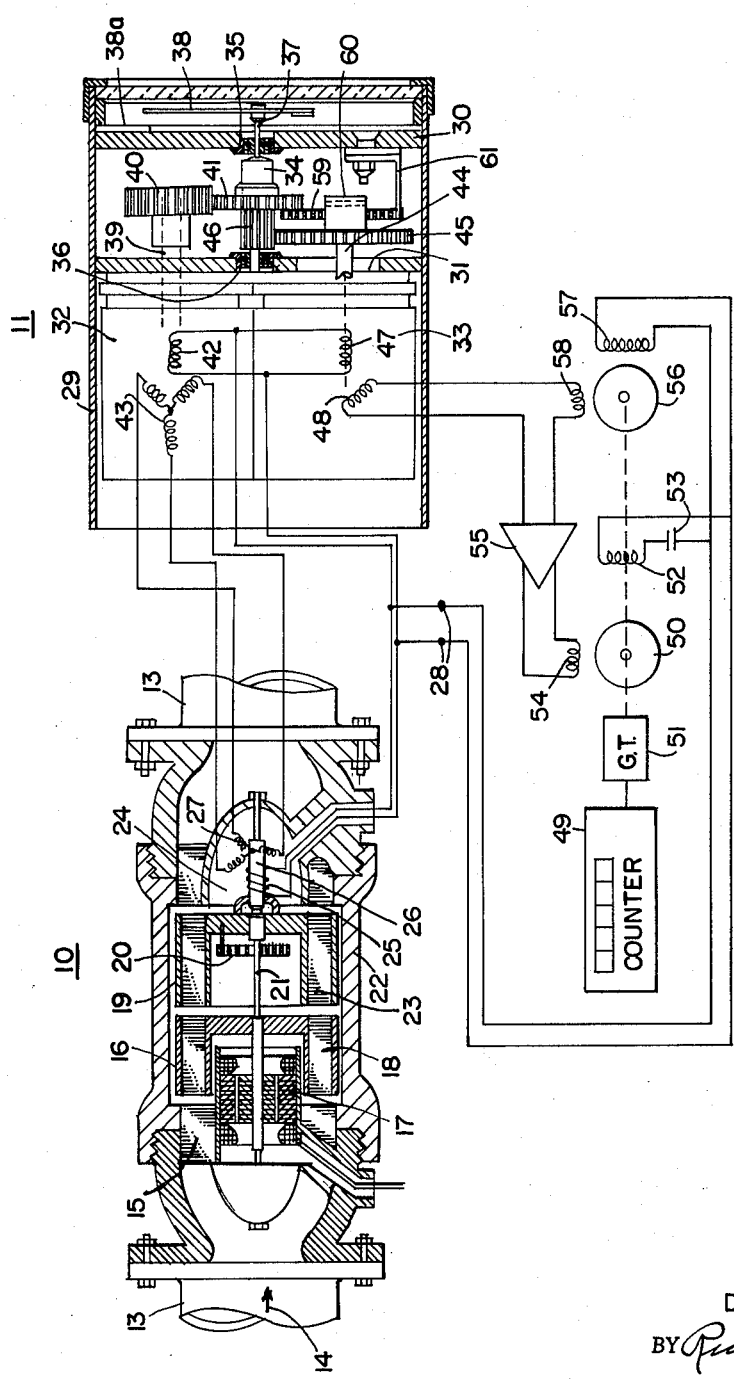

3,258,965
Patented July 5, 1966

3,258,965
FLOWMETER SYSTEM
Dave B. Levins, Swampscott, Mass., assignor to General Electric Company, a corporation of New York
Filed July 12, 1963, Ser. No. 294,645
3 Claims. (Cl. 73—206)

The present invention relates to a flowmeter system and more particularly to a system for indicating flow rate and integrated flow. While the system has general utility, it is particularly useful in mass flowmeter systems used on aircraft to indicate rate of fuel flow to the aircraft power plant and integrated flow of the aircraft fuel.

Mass flowmeters such as shown, for example, in U.S. Patent 2,714,310 are widely used on aircraft to indicate the rate of fuel flow. For many applications it is also desirable to provide an indication of integrated fuel flow. Since the mass flowmeter indicates flow rate, it is necessary to provide some form of integration to integrate the flow rate signal and thereby provide an indication of integrated flow. An integrator in common use is a servo motor system comprising a motor arranged to drive a counter at a speed proportional to the flow rate signal.

Heretofore it has been common practice to use a second servo motor system to drive the pointer of the flow rate indicator and a flow rate signal generator used to control the integrator. Because of the use of two servo motor systems including associated amplifiers and other electrical accessories, flowmeter systems of this type have been costly and complicated, and this fact has tended to preclude the use of such systems on small size commercial aircraft.

Accordingly, it is the principal object of my invention to provide a flowmeter system to indicate flow rate and integrated flow which is relatively simple and which can be manufactured at a relatively low cost.

Another object of the invention is to provide a flowmeter system to indicate flow rate and integrated flow which utilizes only one servo motor system.

Other objects and advantages will become apparent as the following description proceeds.

Briefly, in accordance with my invention I provide a flowmeter system for indicating flow rate and integrated flow comprising three basic components; namely, a flowmeter transmitter, a flow rate indicator and an integrator. The flow rate transmitter of known construction has an output shaft positioned in accordance with flow rate, the output shaft being coupled to actuate an electrical transmitter synchro. The flow rate indicator has an electrical receiver synchro connected to the transmitter synchro so that its output shaft and a connected pointer are positioned in accordance with flow rate. The receiver synchro is also connected to drive the input shaft of a flow rate signal generator through reduction gearing which reduces friction in the system. The output voltage of the flow rate signal generator controls the speed of a motor-driven integrator provided with a totalizing counter to give an indication of integrated flow. In order to prevent continued erroneous indication in the event the receiver synchro is de-energized in an off-zero position, a biasing spring is provided to return the flow rate pointer to the zero flow position in a down-scale direction. The biasing spring also removes the backlash from the reduction gearing to eliminate a further source of possible error in the integrated flow indication. This system has the advantage that it does not require a second servo motor system to drive the flow rate pointer, thereby substantially reducing the cost of the system as compared with the systems now in use which require the use of two servo motor systems.

For a more detailed description of the present invention, reference should now be made to the following detailed description taken in connection with the drawing in which the single figure is a representation, partially in schematic form, of a flowmeter system embodying my invention.

Referring now to the drawing, there is shown a flowmeter system for indicating flow rate and integrated flow comprising three principal components; namely, a flowmeter transmitter indicated generally by numeral 10, a flow rate indicator indicated generally by numeral 11 and an integrator indicated generally by numeral 12.

Fluid flow through a conduit 13 is measured by the flowmeter transmitter 10 which may, as shown, be a two-element mass flowmeter of the type disclosed in U.S. Patent 2,714,310 for "Mass Rate Flowmeter" assigned to to the same assignee as the present invention. Fluid entering the flowmeter in the direction of arrow 14 passes first through an annular array of straightening vanes 15 and then enters the longitudinal, peripheral passages of a generally cylindrical impeller 16 which is rotated by a synchronous electric motor 17 energized from a suitable source of supply (not shown). In these passages which are separated by partitions 18, substantially all of the fluid is accelerated to a substantially uniform linear speed and thus possesses an angular momentum related to its mass. Subsequently, the fluid is decelerated by a rotatable turbine 19 having a construction like that of impeller 16 except that it is resiliently restrained from angular movement by a spiral spring 20 extending between the turbine and a shaft 21 fixed to outer housing 22. As fluid accelerated by the impeller impinges upon the turbine partitions 23 between its flow passages, angular momentum is released to the turbine and it deflects against the force of restraining spring 20 by amounts depending upon the instantaneous mass rate of fluid flow. This angular deflection from a zero flow position is detected by and characterized as an electrical output signal of a transmitter synchro 24, which, in the interest of simplicity and clarity, is schematically shown as comprising an excitation winding 25 rotated by rotor shaft 26 mounted on shaft 21 and a stationary polyphase stator output winding 27. As shown, the excitation winding 25 is connected to a suitable source of alternating current supplied to terminals 28.

The flowmeter indicator 11 comprises a cylindrical casing 29 in which are mounted spaced front and rear supporting plates 30 and 31. Mounted on the rear side of plate 31 in side-by-side position are a receiver synchro 32 and a flow rate signal generator 33. The windings and electrical connections of both of these units are illustrated schematically for simplicity and clarity. Extending between the supporting plates 30 and 31 is a shaft 34 rotatably mounted in and supported by bearings 35 and 36 carried, respectively, by plates 30 and 31. Shaft 34 has an extension 37 extending through a central hole in plate 30 and carries a pointer 38 which indicates flow rate when read in connection with a suitable stationary scale plate 38a mounted on the front of plate 30. The scale plate 38a may, for example, have indicia thereon extending around an arc of approximately 300° to indicate various flow rates as measured by the flowmeter transmitter 10.

Receiver synchro 32 has a rotatable output shaft 39 on which is mounted a gear 40 meshing with a gear 41 mounted on shaft 34.

The receiver synchro 32 has a rotatable excitation winding 42 coupled to rotate with shaft 39 and a stationary polyphase winding 43 connected, as shown, to the output winding 27 of the transmitter synchro 24. As shown, the excitation winding 42 is energized from the A.C. supply terminals 28. As well understood by those familiar with alternating current synchros used to transmit mechanical rotary motion, the shaft 39 of the receiver synchro 32 will rotate in correspondence with the turbine shaft 26 of the flowmeter transmitter 10. In this manner the pointer 38 geared to the receiver synchro shaft 39 will rotate to a position indicative of instantaneous flow rate as measured by the flowmeter transmitter 10.

The flow rate signal generator 33 has a rotatable input shaft 44 to which is secured a gear 45 meshing with a pinion 46 secured to shaft 34 so that the shaft 44 is also driven by the receiver synchro 32 through reduction gearing. Since the range of operation of the signal generator 32 is commonly of the order of 50°, the amount of the gear reduction may be of the order of 6 to 1 so that movement of the pointer 38 over a scale range of 300° will cause a corresponding movement of the shaft 44 of the flow rate signal generator 33 over its operating range of 50°. The flow rate signal generator may be a linear transformer of known construction comprising a rotatable excitation winding 47 driven by shaft 44 and a stationary output winding 48. The orientation of the parts is such that when the pointer 38 is in the zero flow position, the voltage output of the winding 48 is also zero. Rotary movement of the pointer 38 in the up-scale direction causes a linear increase in the voltage output of winding 48. In this manner the voltage output of the winding 48 varies in accordance with the flow rate measured by the flowmeter transmitter 10.

The output voltage of the flow rate signal generator 33 is used to control the operation of the integrator 12 the construction of which will now be described. The integrator comprises a totalizing counter 49 driven by a motor 50 through a suitable reduction gear train 51. The motor is shown as a well-known two-phase alternating current induction motor having an excitation winding 52 connected to the A.C. supply terminals 28 through a capacitor 53 and a control winding 54. It will be understood that in a motor of this type the speed of rotation varies as a function of the voltage applied to the control winding. The output of winding 48 of the flow rate signal generator 33 is fed to the motor control winding 54 through a suitable amplifier 55 and causes the motor to rotate. Also connected to be driven by motor 50 is an alternating current tachometer generator 56 of known construction having an excitation winding 57 energized from the A.C. supply terminals 28 and an output winding 58. A characteristic of this type of tachometer generator is that an A.C. voltage is induced in winding 58 the magnitude of which is proportional to the speed at which the tachometer is driven. As shown, the winding 58 of the tachometer is connected in series circuit relation with the flow rate signal generator winding 48 and the input connections to amplifier 55. The polarity of the winding 58 is selected so that its output voltage opposes the voltage output of winding 48 of the flow rate signal generator. Thus, the speed of motor 50 increases until the voltages in the system balance out, and this occurs when the motor speed reaches a value proportional to the output voltage in winding 48 and hence the mass flow rate measured by the flowmeter transmitter 10. Since the speed of motor 50 is proportional to the mass flow rate, the counter 49 driven by the motor gives a continuous indication of the integrated flow rate. In other words it measures the total flow through the flowmeter transmitter 10 for the period during which a measurement is made and may, for example, be calibrated to read the total weight of fuel which has been consumed by an aircraft power plant.

In a system of the type described where a synchro is used to drive a remotely located flow rate pointer over a range greater than 180°, there is a possibility of serious error should the receiver synchro become de-energized when the pointer 38 is in a position greater than 180° from the zero flow position. This may, for example, occur when the system is de-energized when there is substantial flow of fluid through the flowmeter 10. If the system is re-energized after the flow rate has returned to zero, the receiver synchro 32 and the pointer 38 may try to return to zero by movement in the up-scale rather than the down-scale direction, thus causing the pointer to lock against the stop (not shown) in the maximum flow position. This will cause the integrator 12 to operate at maximum speed for zero flow condition and hence give an erroneous indication of integrated flow. In order to preclude such a malfunction and to secure other advantages mentioned below, there is provided an arrangement for applying a biasing torque to the gear train of the flow rate indicator in a direction to cause the pointer 38 to return to zero in a down-scale direction should the synchro 32 become de-energized. This biasing means may, as shown, be in the form of a coiled spring 59 the inner end of which is secured to a hub 60 mounted on the end of shaft 44 of the flow rate signal generator 33. The outer end of spring 59 is secured to and supported by a bracket 61 bolted to the rear side of supporting plate 30. When the pointer 38 moves up scale, the spring 59 is wound up by rotation of the hub 60 and thus exerts a torque on the gear train comprising the gear 45, pinion 46 and gears 41 and 40 tending to rotate the pointer 38, synchro 32 and flow rate signal generator 33 to the zero flow position. The spring 59 also advantageously acts to remove the backlash from the gear train and thus prevent error in operation of the integrator 12 due to lack of exact correspondence between the positions of synchro shaft 39 and signal generator shaft 44.

It is believed that the operation of my improved flowmeter system will now be clear. When the flow rate through conduit 13 is zero, the turbine 19 of flowmeter 10 will be biased to the zero flow position against a stop (not shown) by spring 20. By operation of the transmitter synchro 24 and receiver synchro 32, the pointer 38 and the flow rate signal generator 33 will also be moved to the zero flow position. Since the output voltage of the flow rate signal generator 33 will be zero, the motor 50 will be stationary and the reading of counter 49 will not change. The counter 49 may be provided with a suitable reset device (not shown) to set the totalizing reading on zero at the beginning of a flow measurement period.

When flow of fluid through conduit 13 occurs, angular momentum is imparted thereto by rotation of impeller 16. This causes turbine 19 to rotate against the force of spring 20 to a position indicative of the instantaneous mass rate of flow through the conduit. The angular displacement of turbine 19 is transmitted to pointer 38 and flow rate signal generator 33 by the synchro transmission system and the interconnecting gearing. Since the output of signal generator 33 corresponds to the measured flow rate, the motor 50 will run at a speed proportional to the flow rate, and the integrated flow rate will be recorded and indicated by the counter 49.

Since this system which provides an indication of flow rate and integrated flow of fluid requires but one servo motor system, a substantial cost reduction is possible over prior art systems utilizing two servo motor systems, i.e., one for the flow rate indicator and the other for the integrator. This has permitted a cost reduction of the order of 40 percent in the cost of the complete system. Because of the action of the biasing spring 59 in preventing erroneous readings resulting from a malfunction of the synchro angular motion transmission system, the necessary reliability is obtained with the cost advantage of using a synchro transmission system in lieu of a second servo motor. The spring 59 also eliminates backlash error in the gearing as pointed out above. Further, it will be noted that the gear reduction between pointer shaft 34 and the flow rate signal generator 33 reduces the effect of friction torque tending to cause error in the position of pointer 38.

While there has been described what is at present considered to be the preferred embodiment of the invention, it will be apparent to those skilled in the art that various changes and modifications may be made therein without departing from the spirit or scope of the invention.

What I claim as new and desire to secure by Letters Patent of the United States is:

1. A flowmeter system for indicating flow rate and total flow comprising
    a flowmeter transmitter having an output shaft positioned in accordance with flow rate, a transmitter synchro having a rotor coupled to said output shaft, an excitation winding energized from a source of A.-C. current and an output winding inductively coupled to the excitation winding, one of said windings being mounted on said rotor for rotation relative to the other winding,
    a flow rate indicator comprising a receiver synchro having a rotor, an excitation winding energized from said source of A.-C. current, a receiver winding inductively coupled to the excitation winding connected to the output winding of said transmitter synchro, one of said windings being mounted on said rotor for rotation relative to the other winding so that the rotor of the indicator moves in angular correspondence with the rotor and output shaft of the transmitter and a flow rate pointer coupled to and positioned by the rotor of said receiver synchro,
    a flow rate signal generator having an input shaft, an excitation winding energized from a source of A.-C. current, and an output winding, the output winding of the flow rate signal generator producing a flow rate signal voltage variable in accordance with the position of the input shaft of the flow rate signal generator,
    an integrator comprising an output shaft, motor means responsive to the output voltage of said flow rate signal generator for driving said integrator output shaft at a speed variable in accordance with the output voltage of said flow rate signal generator and a counter driven by said integrator output shaft to indicate integrated flow,
    drive means coupling the rotor of said receiver synchro to drive the input shaft of said flow rate signal generator, and
    biasing means exerting a torque on said drive means in a direction to return said flow rate pointer in a down-scale direction to a zero flow position when said receiver synchro is de-energized.

2. A flowmeter system for indicating flow rate and total flow comprising
    a flowmeter transmitter having an output shaft positioned in accordance with flow rate, a transmitter synchro having a rotor coupled to said output shaft, an excitation winding energized from a source of A.-C. current and an output winding inductively coupled to the excitation winding, one of said windings being mounted on said rotor for rotation relative to the other winding,
    a flow rate indicator comprising a receiver synchro having a rotor, an excitation winding energized from said source of A.-C. current, a receiver winding inductively coupled to the excitation winding connected to the output winding of said transmitter synchro, one of said windings being mounted on said rotor for rotation relative to the other winding so that the rotor of the indicator moves in angular correspondence with the rotor and output shaft of the transmitter and a flow rate pointer coupled to and positioned by the rotor of said receiver synchro,
    a flow rate signal generator having an input shaft, an excitation winding energized from a source of A.-C. current, and an output winding, the output winding of the flow rate signal generator producing a flow rate signal voltage variable in accordance with the position of the input shaft of the flow rate signal generator,
    an integrator comprising an output shaft, motor means responsive to the output voltage of said flow rate signal generator for driving said integrator output shaft at a speed variable in accordance with the output voltage of said flow rate signal generator and a counter driven by said integrator output shaft to indicate integrated flow,
    gear drive means coupling the rotor of said receiver synchro to drive the input shaft of said flow rate signal generator, and
    biasing means exerting a torque on said gear drive means in a down-scale direction when said receiver synchro is de-energized, said biasing means acting also to remove the backlash from said gear drive means to prevent error in the integrated flow indication of said integrator.

3. A flowmeter system for indicating flow rate and total flow comprising
    a flowmeter transmitter having an output shaft positioned in accordance with flow rate, a transmitter synchro having a rotor coupled to said output shaft, an excitation winding energized from a source of A.-C. current and an output winding inductively coupled to the excitation winding, one of said windings being mounted on said rotor for rotation relative to the other winding,
    a flow rate indicator comprising a receiver synchro having a rotor, an excitation winding energized from said source of A.-C. current, a receiver winding inductively coupled to the excitation winding connected to the output winding of said transmitter synchro, one of said windings being mounted on said rotor for rotation relative to the other winding so that the rotor of the indicator moves in angular correspondence with the rotor and output shaft of the transmitter and a flow rate pointer coupled to and positioned by the rotor of said receiver synchro,
    a flow rate signal generator having an input shaft, an excitation winding energized from a source of A.-C. current, and an output winding, the output winding of the flow rate signal generator producing a flow rate signal voltage variable in accordance with the position of the input shaft of the flow rate signal generator,
    an integrator comprising an output shaft, motor means responsive to the output voltage of said flow rate signal generator for driving said integrator output shaft at a speed variable in accordance with the output voltage of said flow rate signal generator and a counter driven by said integrator output shaft to indicate integrated flow,
    gear reduction drive means coupling the rotor of said receiver synchro to drive the output shaft of said flow rate signal generator at a lower speed, and
    biasing means exerting a torque on said gear reduction drive means in a direction to return said pointer to the zero flow position in a down-scale direction when said receiver synchro is de-energized, said biasing means acting also to remove the backlash from said gear reduction drive means to prevent error in the total flow indication of said integrator.

References Cited by the Examiner

UNITED STATES PATENTS 2,724,969  11/1955  Bolser _____ 73—228
3,071,000  1/1963   Cooper _____ 73—194

OTHER REFERENCES

Ballard et al.: "Mass Flowmeter for Gases," in Oil and Gas Journal, November 12, 1956, volume 50, Number 80, pages 159–161.

RICHARD C. QUEISSER, *Primary Examiner.*

J. J. SMITH, *Assistant Examiner.*